Figure 1:
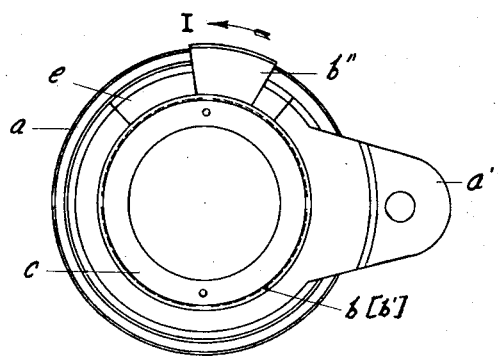

Aug. 4, 1959  K. H. SCHUTZ  2,897,736
THREAD COUPLING FOR PHOTOGRAPHIC OBJECTIVES OR THE LIKE
Filed Nov. 8, 1956

*Inventor:*
KARL HEINZ SCHÜTZ

BY *Karl F. Ror*
AGENT

United States Patent Office 2,897,736
Patented Aug. 4, 1959

2,897,736

THREAD COUPLING FOR PHOTOGRAPHIC OBJECTIVES OR THE LIKE

Karl Heinz Schutz, Kreuznach, Rhineland, Germany, assignor to Jos. Schneider & Co., Optische Werke, Kreuznach, Rhineland, Germany, a firm of Germany Application November 8, 1956, Serial No. 621,133

Claims priority, application Germany November 19, 1955

3 Claims. (Cl. 95—11)

My present invention relates to an arrangement for mounting an attachment, such as a photographic objective, on a supporting body, such as a camera, by means of a threaded coupling mating with a complementary coupling on the support.

In cameras equipped with exchange objectives, for example, it is usual to provide each objective with a threaded flange adapted to be screwed into a threaded socket on the camera. If the objective carries eccentric appendages which in operation are to register with co-operating elements on the camera, precise angular positioning of the objective is required; this is the case, for example, where the objective is provided in well-known manner with an auxiliary trip button designed to actuate the shutter release on the camera while simultaneously resetting the objective diaphragm from a wide-open view-finding position to a preselected picture-taking position or where some indicator on the camera body, e.g. a distance meter, responds to a control element on the objective. Although the initial adjustment of the parts by the manufacturer may have been accurate, prolonged wear of the threads and of the rotation-limiting surfaces will tend to displace the final angular position of the mounted objective by a progressively greater angle so that, after a certain length of use, the co-acting elements of the objective and of the camera will be out of line to such extent that proper operation is no longer possible.

My present invention has for its object the provision of means for correcting the angular position of an attachment screw-threaded onto a support whereby the inconveniences set forth above will be avoided and the useful life span of such attachment will be extended without the use of shims or resurfacing operations.

In accordance with this invention I provide a threaded coupling member, such as a flange, which is secured to the attachment with freedom of limited angular movement relative thereto. The limits of this movement are conveniently defined by a projecting stop element which in two extreme positions abuts co-operating stop means on the attachment, as by being guided in an arcuate slot thereof. When the attachment is rotated to join the threaded coupling member to a mating member on the support, the stop element is urged into one of its limiting positions so that the attachment and its coupling member turn as a unit. If, now, the desired angular position is overshot as the attachment is screwed home on the support, the user reverses the sense of rotation to achieve correct positioning and then, without further displacing the attachment, rotates only the coupling member until the connection is tight. The stop element is advantageously long enough to serve as a handle or lever for effecting this latter rotation.

Figure 2:
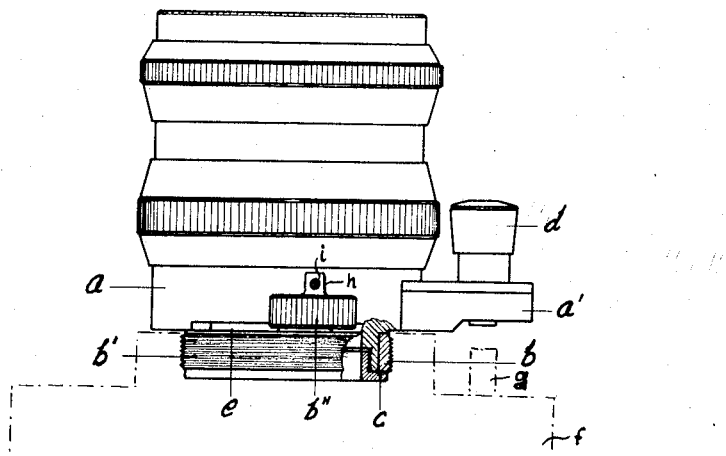

The invention will be described in greater detail with reference to the accompanying drawing in which:

Fig. 1 is a rear view of a photographic objective equipped with a coupling embodying the invention; and Fig. 2 is a top plan view of the objective shown in Fig. 1.

The body $a$ of a conventional objective is provided at its rear, i.e. at the side facing the camera, with a rotatable coupling ring $b$ having external threads $b'$ and a radially projecting lever arm $b''$. A locking ring $c$ holds the coupling ring $b$ against axial displacement relative to objective body $a$ whose laterally extending arm $a'$ is shown to carry a shutter trip button $d$. The lever arm $b''$ is guided in an arcuate slot $e$ of body $a$, centered on the objective axis, which limits the angular displacement of this arm and, thereby, that of locking ring $c$.

In Fig. 2 there is shown in dot-dash lines a camera $f$ whose shutter-release knob $g$ is to be aligned with trip button $d$, so as to be actuatable by the latter, when the objective is operatively mounted on the camera. This is readily accomplished by screwing the objective body $a$ into the camera body $f$ until the meeting surfaces thereof are in contact, at which point the button $d$ may have been rotated somewhat beyond the angular position of knob $g$. If the original sense of rotation of body $a$ has been counter-clockwise as viewed in Fig. 1, as will be the case with right-handed threads $b'$, the user will now turn the objective clockwise until the button $d$ has been correctly positioned. This latter movement may have loosened again the connection between objective and camera since the ring $b$ may have followed this movement even though not being positively entrained at this time by the objective body. By turning the arm $b''$ counter-clockwise (arrow I) the connection is then re-tightened.

It is now possible to freeze the relative position thus established between ring $b$ and objective body $a$ so that thereafter the objective may simply be screwed out of and back into the camera socket without resetting until further wear requires additional adjustment of the parts. This can be accomplished, for example, by the provision of an extension $h$ on arm $b''$ which accommodates a small set screw $i$ adapted to engage the objective body $a$.

My invention is, of course, not limited to the specific arrangement described and illustrated but may be realized in numerous modifications and adaptations without departing from the spirit and scope of the appended claims; it will be apparent, for example, that the position of the male threads (on ring $b$ of the attachment) and of the female threads (on the camera body $f$) could be interchanged.

I claim:

1. A photographic objective adapted to be removably mounted on a camera body, comprising an objective body having an eccentric appendage positionable to register with a co-acting element on said camera body, a threaded ring mounted on said objective body in axially fixed position but with freedom of rotation relative thereto about the objective axis, the threads of said ring mating with complementary threads on said camera body, said objective body having an exposed seating surface surrounding said ring and positioned for engagement with a co-operating surface on said camera body, an operating arm for said ring rigid with the latter and extending substantially radially outwardly therefrom, and a pair of peripherally space abutments on said objective body straddling said operating arm with clearance, thereby limiting the extent of rotation of said ring relative to said objective body.

2. An objective according to claim 1 wherein said objective body is provided with an arcuate slot centered on the objective body is provided with an arcuate slot centered on the objective axis, said slot being traversed by said arm, said abutments constituting a pair of shoulders at the extremities of said slot.

3. An objective according to claim 1, further comprising securing means on said member for releasably immobilizing same relatively to said objective body.

(References on following page)

References Cited in the file of this patent

UNITED STATES PATENTS

| | | |
|---|---|---|
| 2,026,724 | Wollensak | Jan. 7, 1936 |
| 2,500,050 | Wittel | Mar. 7, 1950 |
| 2,541,469 | Guinchard | Feb. 13, 1951 |
| 2,777,371 | Schutz | Jan. 15, 1957 |

FOREIGN PATENTS

| | | |
|---|---|---|
| 1,080,386 | France | May 26, 1954 |